(12) United States Patent
Cai et al.

(10) Patent No.: US 12,233,502 B2
(45) Date of Patent: Feb. 25, 2025

(54) AUTOMATIC FEEDING AND DISCHARGING MACHINING SYSTEM

(71) Applicant: KEDE NUMERICAL CONTROL CO., LTD., Liaoning (CN)

(72) Inventors: Chungang Cai, Liaoning (CN); Renwei Liu, Liaoning (CN); Shengfeng Yu, Liaoning (CN); Yang Wang, Liaoning (CN); Jiming Wang, Liaoning (CN); Feng Wang, Liaoning (CN); Yu Liu, Liaoning (CN); Shihang Qu, Liaoning (CN); Yugang Yin, Liaoning (CN); Yinghua Li, Liaoning (CN); Jiayi Yu, Liaoning (CN); Hu Chen, Liaoning (CN); Jian Wang, Liaoning (CN); Tingting Wang, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 475 days.

(21) Appl. No.: 17/632,937

(22) PCT Filed: Sep. 22, 2020

(86) PCT No.: PCT/CN2020/116908
§ 371 (c)(1),
(2) Date: Feb. 4, 2022

(87) PCT Pub. No.: WO2021/057736
PCT Pub. Date: Apr. 1, 2021

(65) Prior Publication Data
US 2022/0288736 A1 Sep. 15, 2022

(30) Foreign Application Priority Data
Sep. 27, 2019 (CN) .......................... 201910927267.8

(51) Int. Cl.
*B23Q 7/04* (2006.01)
*B23Q 3/06* (2006.01)
(Continued)

(52) U.S. Cl.
CPC ............. *B23Q 7/048* (2013.01); *B23Q 7/045* (2013.01); *B23Q 7/1405* (2013.01);
(Continued)

(58) Field of Classification Search
CPC ......... Y10T 29/5196; Y10T 409/30532; Y10T 409/306048; Y10T 409/305432;
(Continued)

(56) References Cited

U.S. PATENT DOCUMENTS 4,312,110 A * 1/1982 Averyanov ........... B23Q 7/1431
29/33 P
4,404,727 A * 9/1983 Zankl ..................... B23Q 7/046
483/18
(Continued)

FOREIGN PATENT DOCUMENTS

CN 104607981 A * 5/2015
CN 205043305 U 2/2016
(Continued)

*Primary Examiner* — Erica E Cadugan
(74) *Attorney, Agent, or Firm* — MUNCY, GEISSLER, OLDS & LOWE, P.C.

(57) ABSTRACT

An automatic loading and unloading processing system includes a material storage assembly to store workpieces; a positioning device on a worktable; and a transport mechanism to transport the workpiece from the material storage assembly to the positioning device and transport the processed workpiece into the material storage assembly. The material storage assembly includes a material tray; fixing bases; a motion mechanism; and holders on the fixing base for fixing the workpiece, and the motion mechanism controls the movement of the material tray. The transport (Continued)

mechanism includes an auxiliary loading and unloading system arranged at a worktable to grab the holders and move horizontally; and a main loading and unloading system arranged on a main spindle to grab the holders and move vertically.

5 Claims, 6 Drawing Sheets

(51) Int. Cl.
*B23Q 7/10* (2006.01)
*B23Q 7/14* (2006.01)
*B23Q 1/00* (2006.01)

(52) U.S. Cl.
CPC ......... *B23Q 7/1431* (2013.01); *B23Q 7/1494* (2013.01); *B23Q 1/0072* (2013.01); *B23Q 2230/002* (2013.01); *Y10T 29/5196* (2015.01); *Y10T 409/30532* (2015.01); *Y10T 409/305376* (2015.01); *Y10T 409/305432* (2015.01)

(58) Field of Classification Search
CPC ....... Y10T 409/306104; Y10T 29/5124; Y10T 483/16; Y10T 483/165; B23Q 1/0072; B23Q 1/0081–1/009; B23Q 7/1426; B23Q 7/1431; B23Q 7/1494; B23Q 3/066; B23Q 1/66; B23Q 7/04–7/048; B23Q 2230/002; B25J 9/046
USPC .................. 29/33 P, 563; 269/309, 86–286; 409/159, 172, 161, 173; 198/345.3; 483/14–15
See application file for complete search history.

(56) References Cited

U.S. PATENT DOCUMENTS

| | | | | |
|---|---|---|---|---|
| 4,991,706 A | * | 2/1991 | Kitamura | B23Q 7/1494 29/33 P |
| 5,222,285 A | * | 6/1993 | Horikawa | B23Q 7/1494 29/33 P |
| 6,394,892 B2 | * | 5/2002 | Hanisch | B23Q 7/045 451/177 |
| 2010/0313718 A1 | * | 12/2010 | Meidar | B23Q 1/015 82/122 |
| 2014/0319749 A1 | * | 10/2014 | Youngwerth | B23Q 7/043 29/559 |
| 2021/0016404 A1 | * | 1/2021 | Ulrich | B23Q 7/1494 |
| 2022/0274219 A1 | * | 9/2022 | Chen | B23Q 7/1431 |
| 2023/0001526 A1 | * | 1/2023 | Lang | B23Q 1/0072 |

FOREIGN PATENT DOCUMENTS

| | | | |
|---|---|---|---|
| CN | 106002304 A | | 10/2016 |
| CN | 206825082 U | | 1/2018 |
| CN | 109502333 A | | 3/2019 |
| CN | 109879009 A | | 6/2019 |
| CN | 209288372 U | * | 8/2019 |
| CN | 209291483 U | | 8/2019 |
| CN | 110605607 A | | 12/2019 |
| CN | 211072787 U | | 7/2020 |
| JP | 59-001131 A | * | 1/1984 |
| JP | 05-301140 A | * | 11/1993 |
| JP | 2001105203 A | | 4/2001 |
| TW | 202233347 A | * | 9/2022 |

* cited by examiner

AUTOMATIC FEEDING AND DISCHARGING MACHINING SYSTEM

TECHNICAL FIELD

The present invention relates to the technical field of machine tool processing, particularly, to an automatic loading and unloading processing system.

BACKGROUND ART

With the increase of social demand, traditional manpower can no longer meet the supply demand of the society. In the process of machine tool processing, the traditional method is to manually clamp a blank of a workpiece through a turntable, and then process the blank of the workpiece. After the processing is completed, the processed workpiece is manually removed. During this process, the machine tool stops for too long and cannot work continuously, resulting in low production efficiency, poor workpiece processing consistency, and manual operation may cause problems such as mechanical damage and personal injury.

SUMMARY OF INVENTION

The present invention provides an automatic loading and unloading processing system to overcome the above technical problems.

The present invention is an automatic loading and unloading processing system, comprising:
a material storage assembly; a transport mechanism; and a positioning device,
wherein the material storage assembly is used to store workpieces;
the transport mechanism is used to transport the workpiece to be processed from the material storage assembly to the positioning device, and transport the processed workpiece into the material storage assembly;
the material storage assembly includes: a material tray; a plurality of fixing bases; a motion mechanism; and a plurality of holders for fixing the workpiece, and the holders are fixed on the fixing base, and the motion mechanism controls the movement of the material tray so that the position of the holders corresponds to the position of the transport mechanism;
the transport mechanism includes:
a main loading and unloading system that is arranged on a machining main spindle ram to grab the holders grabbed by the auxiliary loading and unloading system and moves along a Z axis of a machining center; and
an auxiliary loading and unloading system that is arranged at one support end of the worktable to grab the holders on the material tray or grab the holders on the main loading and unloading system and moves along an X-axis and/or Y-axis of the machining center,
wherein the positioning device is arranged on the worktable to fix the holders grabbed by the main spindle jaw.
Further, the positioning device includes a tooling motherboard; and the tooling motherboard is fixed on the worktable, and a zero-point positioning device is arranged below the holders.
Further, the auxiliary loading and unloading system includes a fixation structure and a jaw,
the fixation structure is fixed on one side of the worktable close to the material storage assembly, and the jaw is arranged above the fixation structure and on the side close to the material storage assembly.

Further, the main loading and unloading system includes
a cylinder, a piston rod, a clamping structure, a linear bearing, and a fixation plate; and
the cylinder drives the piston rod and the linear bearing to move along the Z axis of the machining center in a through hole of the fixation plate, one end of the linear bearing and one end of the piston rod which is close to the main spindle are connected to the clamping structure, and the fixation plate is fixedly connected to the main spindle ram.
Further, the fixing base includes
a chute, and engaging members;
extension lines of the chutes of the plurality of the fixing bases meet in the center of the material tray, and the engaging members are arranged on both sides of the chutes; and
the holder includes: a bottom board and a fixation structure body, one end of the fixation structure body is fixedly connected to the workpiece, and the other end of the fixation structure body is fixedly connected to the bottom board, and a positioning pull stud bolt is arranged below the bottom board, engaging plates parallel to the chute are arranged on both sides of the bottom board, and engaging grooves are arranged on two opposite sides of the engaging plate.

The present invention realizes an automatic loading and unloading function by setting a feeding mechanism capable of automatic feeding and a loading mechanism with automatic loading to cooperate with each other, thereby reducing the waiting time or preparation time of workpiece processing greatly, improving the working efficiency, and saving manpower at the same time.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

DESCRIPTION OF REFERENCE SIGNS 1. material tray; 2. fixing base; 3. motion mechanism; 4. holder; 5. auxiliary loading and unloading system; 6. main loading and unloading system; 7. positioning device; 8. zero-point positioning device; 9. workpiece; 201. chute; 202. engaging member; 401. bottom board; 402. fixation structure body; 403. pull stud bolt; 404. engaging plate; 405. engaging groove; 501. fixation structure; 502. jaw; 602. piston rod; 603. clamping structure; 604. linear bearing; 605. fixation plate.

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. Based on the embodiments of the present invention, all other embodiments obtained by a person skilled in the art without creative efforts are within the protection scope of the present invention.

Figure 1:
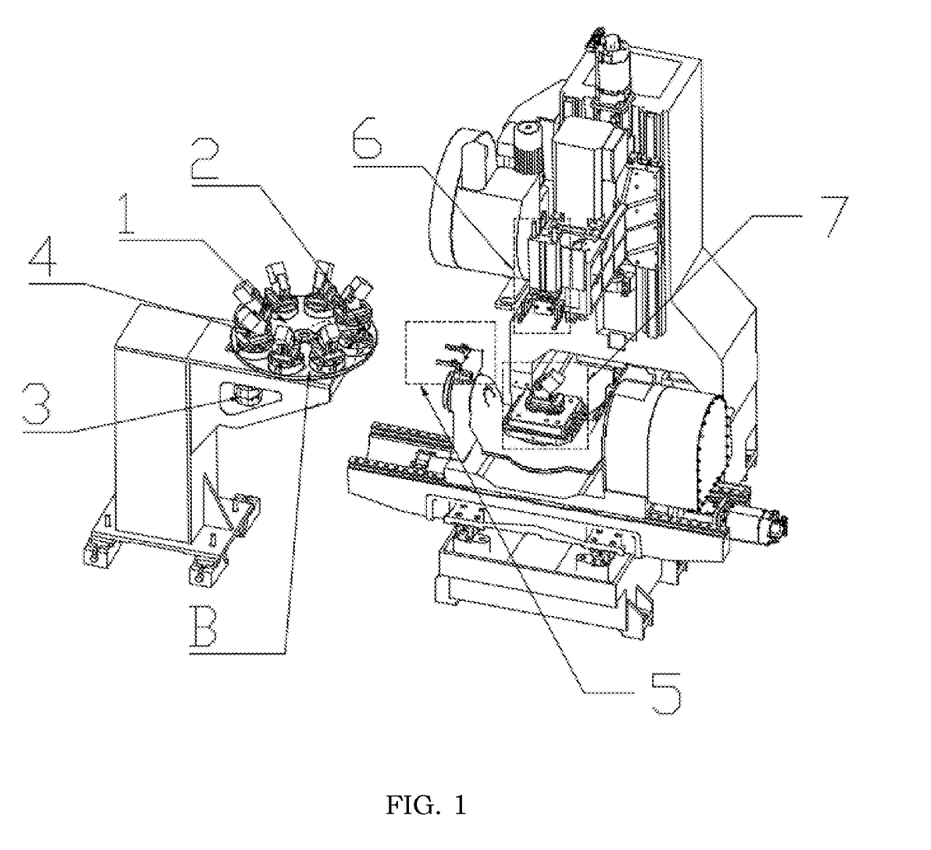
FIG. 1 is the structure schematic diagram of the automatic loading and unloading processing system of the present invention.

FIG. 1 is the automatic loading and unloading processing system of the present invention, and as shown in FIG. 1, the automatic loading and unloading processing system of this embodiment includes:

a material storage assembly; a transport mechanism; and a positioning device,
wherein the material storage assembly is used to store workpieces;
the transport mechanism is used to transport the workpiece to be processed from the material storage assembly to the positioning device, and transport the processed workpiece into the material storage assembly;
the material storage assembly includes: a material tray 1; a plurality of fixing bases 2; a motion mechanism 3; and a plurality of holders 4 for fixing the workpiece, and the holders are fixed on the fixing base, and the motion mechanism controls the movement of the material tray so that the position of the holders corresponds to the position of the transport mechanism;
the transport mechanism includes:
a main loading and unloading system 6 that is arranged on a machining main spindle ram to grab the holders grabbed by the auxiliary loading and unloading system and moves along a Z axis of a machining center; and
an auxiliary loading and unloading system 5 that is arranged at one support end of the worktable to grab the holders on the material tray or grab the holders on the main loading and unloading system and moves along an X-axis and/or Y-axis of the machining center;
and the positioning device 7 is arranged on the worktable to fix the holders grabbed by the main spindle jaw.

Specifically, the automatic loading and unloading processing system of this embodiment includes: a material storage assembly, a transport mechanism and a positioning device. Here, the material storage assembly for storing workpieces includes a material tray 1, a plurality of fixing bases 2 are arranged on the material tray, and the fixing bases are used to fix the holders above. The bottom of the material tray is provided with a motion mechanism 3, the motion mechanism can be a motor, and the motor controls the rotation of the material tray. Thereby, the holders 4 on the material tray are driven to rotate, so that the holders correspond to the positions of the transport mechanism. The material conveying structure includes two parts: the auxiliary loading and unloading system 5 is the first part arranged on the shell of the worktable support end on the side close to the material tray; the main loading and unloading system 6 is the second part arranged on the main spindle ram and moves along the Z axis of the machining center. The auxiliary loading and unloading system moves along the X axis and/or Y axis of the machining center to the material tray through the guide rail under the worktable to grab the holders with workpieces on the material tray or grab the holders with workpieces in the main loading and unloading system. Through the cooperation of the auxiliary loading and unloading system and the main loading and unloading system, the automatic loading and unloading of the holders between the material tray and the worktable is completed. A positioning device is provided on the worktable, and the positioning device positions the holders grabbed by the main spindle jaw on the worktable, thereby completing the processing of the workpieces by the main spindle.

Further, the positioning device includes a tooling motherboard; and
the tooling motherboard is fixed on the worktable, and a zero-point positioning device 8 is arranged below the holders.

Figure 4:
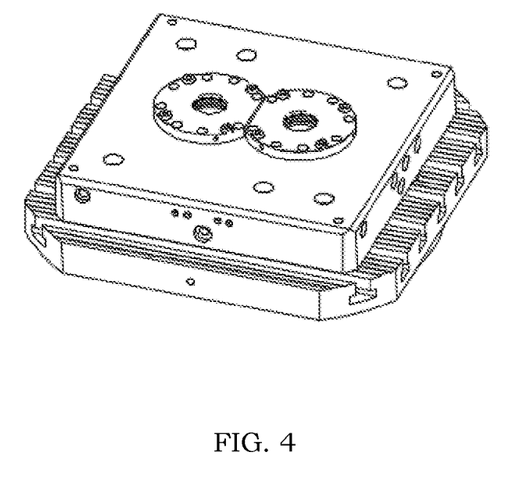
FIG. 4 is the schematic diagram of the zero-point positioning device of the present invention.

Specifically, the tooling motherboard of this embodiment is fixed on the worktable, and the holders grabbed by the main spindle jaw are fixed by the zero-point positioning device. As shown in FIG. 4, the zero-point positioning device belongs to a constant lock mechanism, which is opened during ventilation and locked when the air is cut off. When hydraulic or air pressure is applied to the zero-point positioning device, the pressure will compress the spring below through the piston, the steel balls will spread out to both sides, and then the pull stud bolt at the bottom of the holder can be taken out. When the power source is cut off, the spring will push the piston upward, and the piston will gather the steel balls to the middle, thereby clamping the steel balls. The pull stud bolt at the bottom of the holder is then locked.

The positioning device of this embodiment solves the problem of poor consistency in batch processing of workpieces caused by the inability of manual loading and unloading to ensure a fixed clamping position, reduces the dispersion of workpiece accuracy, and realizes that the workpieces have a Gaussian normal distribution.

Further, the auxiliary loading and unloading system includes a fixation structure and a jaw, the fixation structure is fixed on one side of the worktable close to the material storage assembly, and the jaw is arranged above the fixation structure and on the side close to the material storage assembly.

Further, the main loading and unloading system includes a cylinder, a piston rod, a clamping structure 603, a linear bearing 604, and a fixation plate 605;
wherein the cylinder drives the piston rod and the linear bearing to move along the Z axis of the machining center in a through hole of the fixation plate, one end of the linear bearing and one end of the piston rod close to the main spindle are connected to the clamping structure, and the fixation plate is fixedly connected to the main spindle ram.

Figure 8:
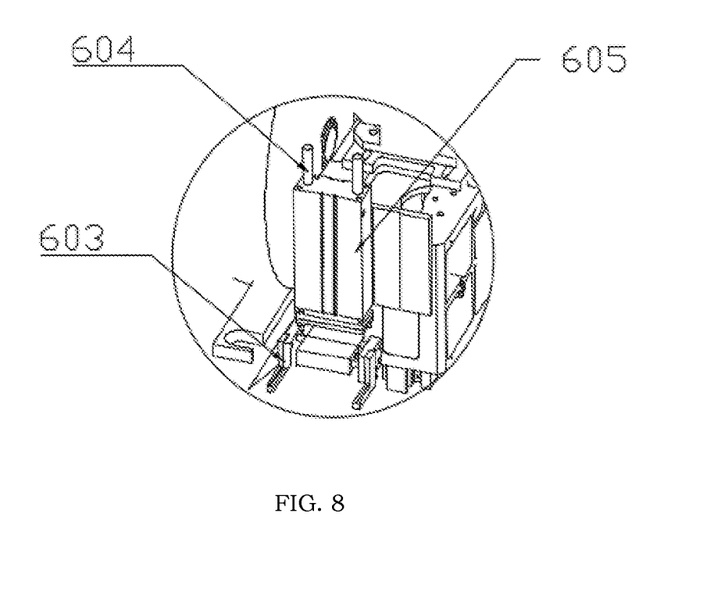
FIG. 8 is the enlarged view of C of FIG. 5.
Figure 9:
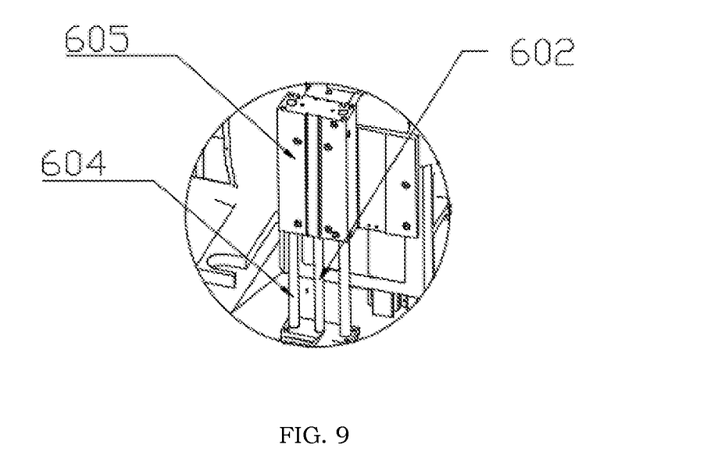
FIG. 9 is the enlarged view of D of FIG. 6.
Figure 10:
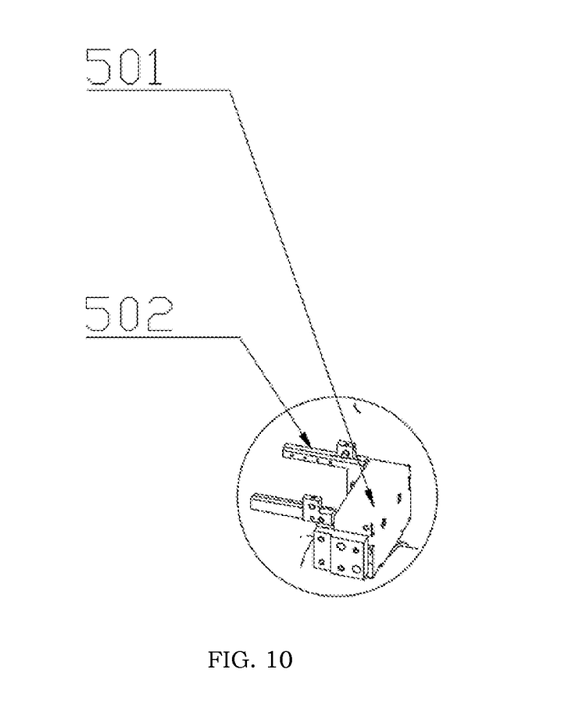
FIG. 10 is the enlarged view of A of FIG. 7.

Specifically, as shown in FIG. 8 and FIG. 9, the fixation plate of the main loading and unloading system of this embodiment is fixedly connected to the main spindle ram, and the fixation plate 605 is provided with 3 through holes, the linear bearings 604 are provided in the through holes on both sides among the 3 through holes, and a piston rod 602 is provided in the middle through hole, and a cylinder (not shown in the figure) drives the piston rod to move along the Z axis of the machining center. The linear bearings ensure the stability of the clamping structure 603 of the main spindle jaw when it moves along the Z axis of the machining center.

Further, the fixing base includes
a chute 201, and engaging members 202;
extension lines of the chutes of the plurality of the fixing bases meet in the center of the material tray, and the engaging members are arranged on both sides of the chutes; and
the holder includes: a bottom board 401 and a fixation structure body 402, one end of the fixation structure body is fixedly connected to the workpiece, and the other end of the fixation structure body is fixedly connected to the bottom board, and a positioning pull stud bolt is arranged below the bottom board, engaging plates 404 parallel to the chute are arranged on both sides of the bottom board, and engaging grooves 405 are arranged on two opposite sides of the engaging plate.

Figure 2:
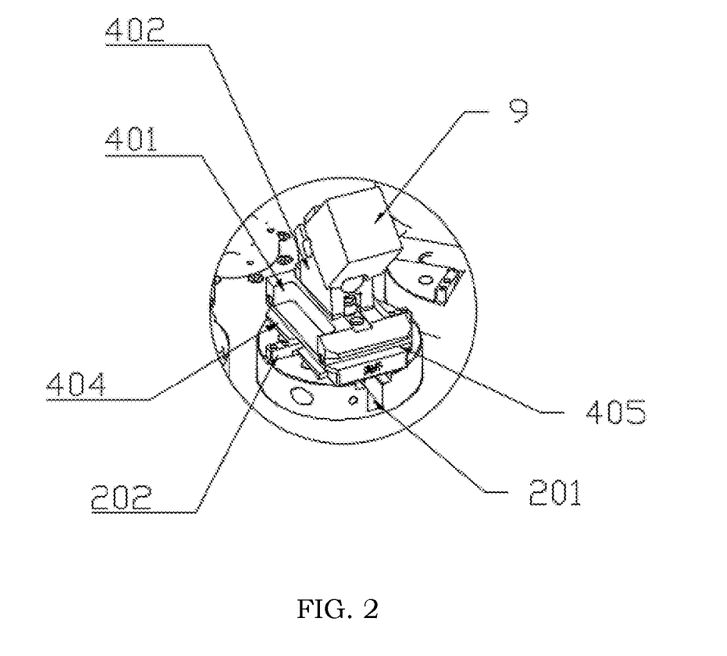
FIG. 2 is the enlarged view of B of FIG. 1.
Figure 3:
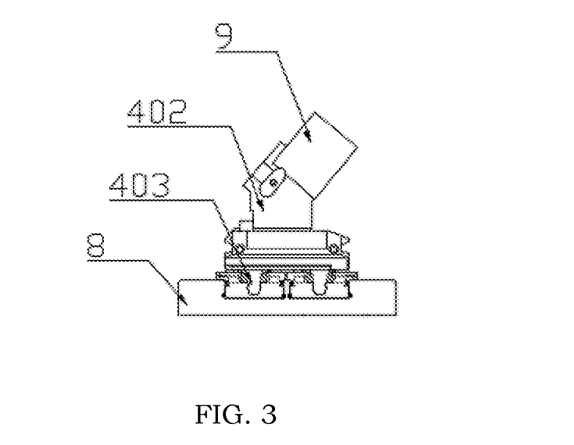
FIG. 3 is the sectional view of the holder of the present invention being placed at the position of the zero-point positioning device.

Specifically, as shown in FIGS. 2 and 3, the holder on the material tray includes a bottom board and a fixation structure body. The top end of the fixation structure body is fixedly connected to the workpiece by bolts, and the bottom end is fixedly connected to the bottom board by bolts. Two positioning pull stud bolts 403 are set at the bottom of the bottom board, and the pull stud bolts slide in from the chute 201 of the fixing base. The two engaging members 202 on both sides of the chute of the fixing base and the engaging plates 404 on both sides of the bottom board are engaged with each other. The jaw of the auxiliary loading and unloading system is engaged with the engaging plate. The two engaging members are also used to define the stroke of the jaw of the auxiliary loading and unloading system. Thus, accurate grabbing of the jaw is achieved. The engaging grooves on the opposite sides of the engaging plate are used to engage the clamping structure of the main spindle jaw.

The working process of the automatic loading and unloading processing system of the present invention is as follows.

Figure 5:
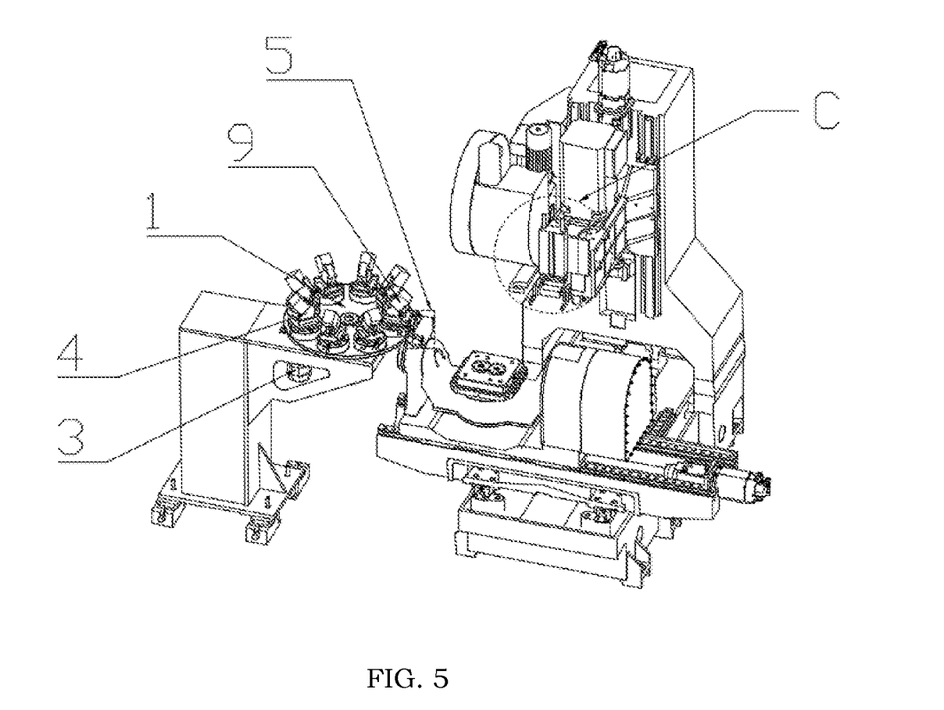
FIG. 5 is the pickup process schematic diagram of the auxiliary loading and unloading system of the present invention.

As shown in FIG. 5, the motion mechanism of the material storage assembly rotates the material tray, and rotates the position of the holder to correspond to the auxiliary loading and unloading system of the transport mechanism. The auxiliary loading and unloading system moves along the X axis and/or Y axis of the machining center to the material tray through the guide rail under the worktable to grab the holders with workpieces on the material tray. The jaw of the auxiliary loading and unloading system is engaged with the engaging plate on the bottom board of the holder, the auxiliary loading and unloading system moves along the X axis of the machining center, and the positioning pull stud bolts at the bottom of the bottom board slide out from the chute of the fixing base. Thus, the pickup process of the auxiliary loading and unloading system is completed.

Figure 6:
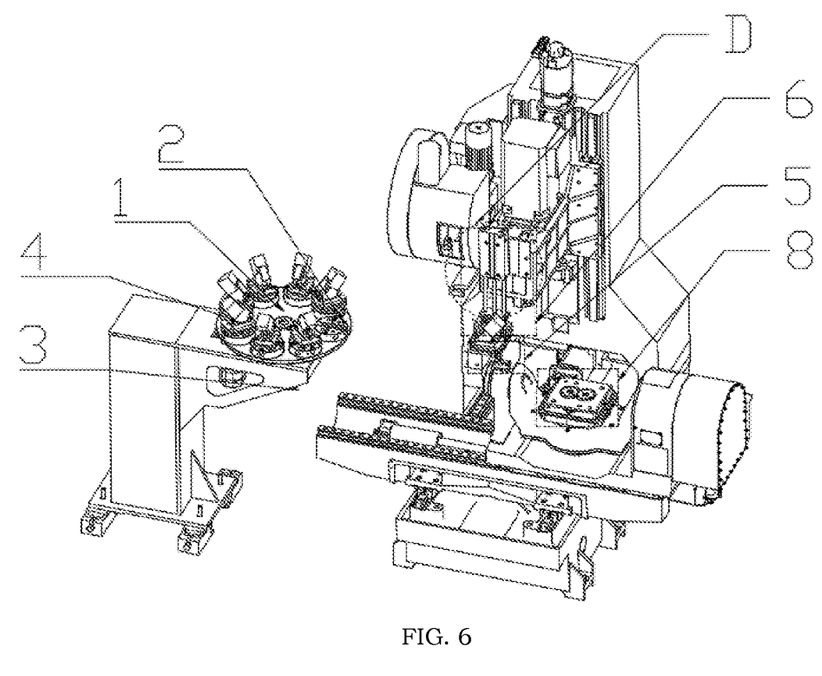
FIG. 6 is a schematic diagram of the exchange process of the workpiece of the present invention from the auxiliary loading and unloading system to the main loading and unloading system.

As shown in FIG. 6, the auxiliary loading and unloading system moves along the X and Y axes of the machining center to below the main loading and unloading system, the main loading and unloading system moves down along the Z axis of the machining center, the clamping structure of the main loading and unloading system is engaged into the engaging groove of the holder, takes out the holder from the auxiliary loading and unloading system, and completes the exchange process of the workpiece from the auxiliary loading and unloading system to the main loading and unloading system.

Figure 7:
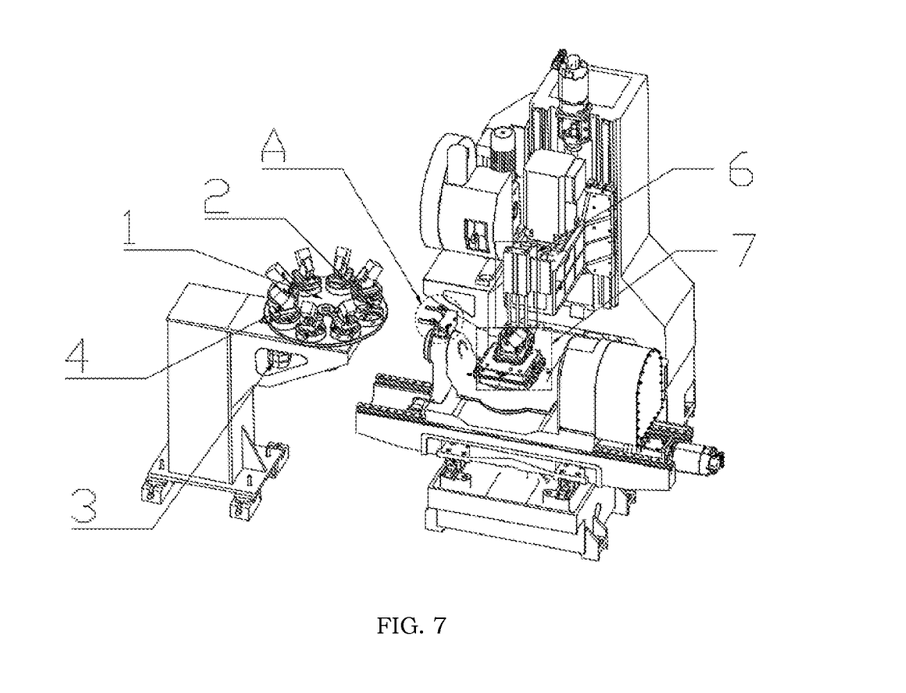
FIG. 7 is a schematic diagram of the process of the main loading and unloading system driving the holder to the positioning device of the present invention.

As shown in FIG. 7, the worktable moves along the X axis and/or Y axis of the machining center to below the main loading and unloading system, the main loading and unloading system drives the holder to move downward, and places the holder on the positioning device. The positioning device fixes the holder onto the worktable. Thus, the automatic loading process of the workpiece is completed. The unloading of workpiece is the reverse process of the above process, and will not be elaborated here. The present invention realizes an automatic loading and unloading function by setting a feeding mechanism capable of automatic feeding and a loading mechanism with automatic loading to cooperate with each other, thereby improving the working efficiency and the machining accuracy of workpieces, and saving manpower at the same time.

Finally, it should be noted that the above embodiments are only used to illustrate the technical solutions of the present invention, but not to limit them. Although the present invention has been described in detail with reference to the foregoing embodiments, a person skilled in the art should understand that the technical solutions described in the foregoing embodiments can be further modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. An automatic loading and unloading processing system, comprising:
    a material storage assembly; a transport mechanism; and a positioning device, wherein
    the material storage assembly is used to store workpieces;
    the transport mechanism is used to transport the workpieces between the material storage assembly and the positioning device;
    the material storage assembly includes: a material tray; a plurality of fixing bases; a motion mechanism; and a plurality of holders for fixing the workpieces, and the holders are fixed on the fixing bases, and the motion mechanism rotates the material tray to move one of holders to correspond to the transport mechanism;
    the transport mechanism includes:
    an auxiliary loading and unloading system arranged at a worktable to grab the one of the holders on the material tray and to move the one of holders horizontally and;
    a main loading and unloading system arranged on a main spindle ram to grab the one of the holders grabbed by the auxiliary loading and unloading system and to move the one of the holders vertically; and,
    wherein the positioning device is arranged on the worktable to fix the holders grabbed by the main loading and unloading system.

2. The automatic loading and unloading processing system according to claim 1, wherein the positioning device is fixed on the worktable, and the positioning device includes a zero-point positioning device arranged below the one of the holders to fix the one of the holders grabbed by the main loading and unloading system.

3. The automatic loading and unloading processing system according to claim 1, wherein the auxiliary loading and unloading system includes a fixation structure and a jaw to engage the one of the holders, wherein the fixation structure is fixed on the worktable, and the jaw is arranged above the fixation structure.

4. The automatic loading and unloading processing system according to claim 1, wherein the main loading and unloading system includes a piston rod, a clamping structure, a linear bearing, and a fixation plate, wherein the piston rod and the linear bearing are driven to move vertically in a through hole of the fixation plate, one end of the linear bearing and one end of the piston rod are connected to the clamping structure, and the fixation plate is fixedly connected to the main spindle ram.

5. The automatic loading and unloading processing system according to claim 1, wherein each of the fixing bases includes a chute, and engaging member arranged on two sides of the chute;

wherein extension lines of the chutes of the plurality of the fixing bases meet in the center of the material tray; and wherein each of the holders includes: a bottom board and a fixation structure body, one end of the fixation structure body is fixedly connected to one of the workpieces, and another end of the fixation structure body is fixedly connected to the bottom board, and a positioning pull stud bolt is arranged below the bottom board, an engaging plate is arranged on the bottom board and parallel to one of the chute, and an engaging groove is arranged on the engaging plate.

* * * * *